Patented Jan. 8, 1946

2,392,750

UNITED STATES PATENT OFFICE 2,392,750

DEHYDROGENATION OF HYDROCARBONS

Norman F. Linn, Mountainside, N. J., assignor to Standard Oil Development Company, a corporation of Delaware No Drawing. Application August 22, 1942, Serial No. 455,701

9 Claims. (Cl. 260—669)

My present invention relates to catalytic dehydrogenation of hydrocarbons, and more particularly, it relates to improved catalysts for dehydrogenating olefins and aralkyl hydrocarbons, and to methods for preparing the said catalysts.

My present invention is particularly adapted to the dehydrogenation of low molecular weight olefin hydrocarbons having from 2 to 10, preferably 2 to 6, carbon atoms, but is also applicable to dehydrogenation of aralkyl hydrocarbons, such as ethyl and propyl benzene to form styrene and phenyl methyl ethylenes respectively.

Recently, processes designed to convert butene to butadiene have become of increased importance due to the fact that butadiene is an essential intermediate in one of the more important methods for the production of synthetic rubber-like materials.

In the production of diolefins from olefins by the catalytic dehydrogenation of mono-olefins, it is, of course, desirable to obtain as high a yield of the diolefin as possible per one passage of the butene through the dehydrogenation zone, and as a corollary to this purpose, it is also a desideratum to this type of process to obtain as small an amount as possible of by-products. It is also desirable to conduct the dehydrogenation under such conditions that the fouling of the catalyst is minimized to as great an extent as possible. The efficiency of the catalyst is best measured in terms of per cent selectivity. For example, if 50% of the initial material undergoes conversion of some sort, and 30% of the initial material is converted to the desired product, then the per cent selectivity would be 60.

I have now discovered a new type of catalyst which when used under certain conditions in the dehydrogenation of hydrocarbons makes it possible to obtain substantially greater yields of the desired dehydrogenation product than can be obtained by the use of previously known catalysts. The nature of this new type of catalyst and the conditions under which it is used will be fully understood from the following description.

Now in my present application, I propose to use as a base, zirconium oxide, and this material should constitute the major portion of the entire catalyst composition. The following table gives the range of each component which may be used:

| Component: | Per cent by weight |
|---|---|
| $ZrO_2$ | 50–97 |
| $Fe_2O_3$ | 3–50 |
| Promoter | .5–15 |
| Stabilizer | 1–15 |

Among the alkali metal and alkaline earth oxides which may be used as promoters, the oxides of calcium, sodium and strontium generally are preferred, but potassium oxide is greatly superior.

However, I wish to point out that some of the desired conversion is obtained by omitting the promoter and the stabilizer and compounding the catalyst only from the base and the active ingredient.

The following stabilizers give good results: Oxides of metals of the right-hand side (transition series) of groups I, II, and III of the periodic system, particularly oxides of copper, silver, cadmium; non-acidic transition oxides of chromium, manganese, cobalt and nickel; and non-acidic oxides of thorium, zirconium, cerium, lead, bismuth, and particularly aluminum and thorium.

The present catalyst can be improved in activity by including a fifth component, viz., silica in gel form a mounting to 1% by weight of the total composition.

One particularly effective catalyst of the above type, including the promoter and the stabilizer, has the following composition:

| Component: | Parts by weight |
|---|---|
| $ZrO_2$ | 80 |
| $Fe_2O_3$ | 20 |
| $K_2O$ | 5 |
| $CuO$ | 5 |

The above catalysts may conveniently be prepared as follows:

A solution of 517 gr. of ferric nitrate crystals and 77 gr. of copper nitrate crystals in 3 liters of distilled water was stirred into a suspension of 400 gr. of zirconium oxide in 2 liters of water. A solution of 340 gr. of $K_2CO_3$ in 400 cc. of distilled water was added slowly and the suspension was stirred and heated at 80–90° C. for one hour. The precipitate was filtered, thoroughly washed, and thoroughly mixed with a solution of 37.5 gr. $K_2CO_3$ in 200 cc. of water. The mixture was dried, heated 3 hours at 1200° F. and formed into pellets.

The above catalysts possess a high degree of selectivity for the dehydrogenation of normal butene to butadiene, the selectivity being of the order of 70–85%.

In order to set forth the utility of my invention, the following description of a test in which butene-1 was dehydrogenated to form butadiene when employing a zirconium oxide base catalyst is set forth below:

845 volumes of normal butenes and 6100 volumes of steam (gas volumes at normal T & P.) were passed in one hour over one volume of the catalyst whose preparation was described above, at a temperature of 1200° F. Butene converted to other products amounted to 41% and the selectivity was 72.6% (29.8 converted to butadiene).

By operating at lower temperatures or higher throughputs the conversion may be reduced to 25% with an increase in selectivity to 80%.

In carrying out the process using catalysts of the type above described, the hydrocarbon, preferably with steam, is passed over the catalyst at a rate between 50 and 5000, preferably between 100 and 1000 volumes (measured at normal temperature and pressure) of hydrocarbon per volume of catalyst per hour. The ratio of steam to hydrocarbon is between 30:1 and 1:1, preferably from 8:1 to 4:1. The reaction chamber is maintained at a temperature between 1000 and 1600° F., preferably between 1100° F. and 1300° F. and under atmospheric, below atmospheric, or above atmospheric pressure. The hydrocarbon which passes through the reaction zone unaffected may of course be recycled thereto.

The principal function of the steam is to dilute the hydrocarbon and thus reduce the partial pressure thereof in the reaction zone. At the same time, however, the steam performs another useful function in that it reacts with coke which may be deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 15, 25 or 50 hours or more although it is usually preferable in operation to run for periods of ½ hour to 10 hours and then regenerate.

Regeneration of the catalyst may be effected by shutting off the flow of hydrocarbon and passing steam, air, or a mixture of steam and air through the catalyst mass while it is maintained at a temperature between 1100° F. and 1300° F. Following substantially complete removal of coke from the catalyst in this manner, the flow of hydrocarbon and steam may be resumed.

My present invention may be carried out either in the stationary bed type of operation or a fluid catalyst type of operation. In the former, the catalyst is contained in a case or reactor and the mixture of steam and hydrocarbons is simply forced through the material, preferably being discharged into the top, forced through the catalyst, and withdrawn from the bottom. The catalyst is preferably in the form of pellets, pills, granules, and the like. In the fluid catalyst type of operation, the catalyst is in the form of a powder having a particle size of from 100 to 400 mesh and is discharged into the reaction zone from a standpipe together with the hydrocarbon to be dehydrogenated and steam, the catalyst and vapors entering preferably at a point at the bottom of the reactor and passing upwardly through a grid and forming within the reactor a dense phase suspension, that is to say, a suspension of catalyst in the gases of a concentration such that each cubic foot contains from 2 to 35 or more lbs. of catalyst. This dense phase may be formed within the reaction zone above the grid by controlling the linear velocity of gases or vapors by regulating them within the range of say ½ to 8 to 10 ft./sec. Continuity of operation may be thus obtained and the catalyst may be withdrawn through a bottom draw-off pipe regenerated, if necessary, and returned preferably substantially uncooled through the aforementioned standpipe to the reactor. The precise details, however, of operating the reactor do not form an important aspect of my present invention and any known reactor adapted to provide good contact between the solid and gas may be employed.

To recapitulate, my present invention relates to improvements of dehydrogenation catalysts, to the methods of preparing such catalysts, and is characterized briefly by the fact that I employ a zirconium oxide base in addition to iron oxide, and, if desired, a small amount of a promoter and/or a stabilizer. An outstanding advantage of my invention is that I may carry out the dehydrogenation of a hydrocarbon in the presence of large quantities of steam without injuring the catalyst and thus I may greatly extend the life of catalysts since the presence of steam tends to retard the deposition of hydrocarbon contaminants upon the catalyst. Also, the presence of steam makes it possible to supply the heat necessary for this highly endothermic reaction by the superheating of the said steam at least in substantial part and also makes it possible, particularly with the stationary bed type of operation, to control the contact time since dilution with steam of the entering reactant makes it possible to vary the reaction time virtually to any desired value regardless of how small that contact time interval may be.

What I claim is:

1. An improved process for the catalytic dehydrogenation of hydrocarbons containing at least four carbon atoms and selected from the class consisting of mono-olefins and alkylated aryl compounds containing at least two carbon atoms in the alkyl group, which comprises passing said hydrocarbons admixed with steam over a catalyst containing from 50–97 weight per cent zirconium oxide, 30–50 weight per cent $Fe_2O_3$, 1–15 weight per cent of an oxide of a metal of the right-hand side of groups I, II, and III of the periodic system, and from 0.5–15 weight per cent of potassium oxide.

2. An improved process for the catalytic dehydrogenation of hydrocarbons containing at least four carbon atoms and selected from the class consisting of monoolefins and alkylated aryl compounds containing at least two carbon atoms in the alkyl group, which comprises passing said hydrocarbons admixed with steam over a catalyst containing zirconium oxide 80 parts by weight, $Fe_2O_3$ 20 parts by weight, $K_2O$ 5 parts by weight, and $CuO$ 5 parts by weight.

3. An improved process for the catalytic dehydrogenation of mono-olefins containing at least four carbon atoms which comprises passing said mono-olefins admixed with steam over a catalyst containing from 50–97 weight per cent zirconium oxide, 30–50 weight per cent $Fe_2O_3$, 1–15 weight per cent of an oxide of a metal of the right-hand side of groups I, II, and III of the periodic system, and from 0.5–15 weight per cent of potassium oxide.

4. An improved process for the catalytic dehydrogenation of butenes which comprises passing said butenes admixed with steam over a catalyst containing from 50–97 weight per cent zirconium oxide, 30–50 weight per cent $Fe_2O_3$, 1–15 weight per cent of an oxide of a metal of the right-hand side of groups I, II, and III of the periodic system, and from 0.5–15 weight per cent of potassium oxide.

5. An improved process for the catalytic dehydrogenation of ethyl benzene which comprises passing said ethyl benzene admixed with steam over a catalyst containing from 50-97 weight per cent zirconium oxide, 30-50 weight per cent $Fe_2O_3$, 1-15 weight per cent of an oxide of a metal of the right-hand side of groups I, II, and III of the periodic system, and from 0.5-15 weight per cent of potassium oxide.

6. In the catalytic dehydrogenation of ethyl benzene, the improvement which comprises contacting said ethyl benzene admixed with steam at dehydrogenation temperatures with a catalyst consisting of 80 parts by weight zirconium oxide, 20 parts by weight $Fe_2O_3$, 5 parts by weight $K_2O$, and 2 parts by weight CuO.

7. An improved process for the catalytic dehydrogenation of butene which comprises contacting said butene admixed with steam at dehydrogenation temperatures with a catalyst consisting of 80 parts by weight zirconium oxide, 20 parts by weight $Fe_2O_3$, 5 parts by weight $K_2O$, and 5 parts by weight CuO.

8. An improved process for the catalytic dehydrogenation of mono-olefins containing at least four carbon atoms which comprises passing said mono-olefins diluted with 1-30 volumes of steam per volume of olefin at temperatures between 1000-1600° F. over a catalyst comprising a major proportion of zirconium oxide, a minor proportion of iron oxide, and from 0.5-15 weight per cent of potassium oxide.

9. An improved process for the catalytic dehydrogenation of ethyl benzene which comprises passing said ethyl benzene diluted with from 1-30 volumes of steam per volume of ethyl benzene at temperatures between 1000-1600° F. over a catalyst comprising a major proportion of zirconium oxide, a minor proportion of iron oxide, and from 0.5-15 weight per cent of potassium oxide.

NORMAN F. LINN.